US011351556B2

(12) United States Patent
Kalke et al.

(10) Patent No.: US 11,351,556 B2
(45) Date of Patent: Jun. 7, 2022

(54) METHOD FOR OPERATING A HIGH-VOLTAGE PULSE SYSTEM

(71) Applicant: selFrag AG, Kerzers (CH)

(72) Inventors: Jürgen Kalke, Müntschemier (CH); Reinhard Müller-Siebert, Bern (CH)

(73) Assignee: selFrag AG, Kerzers (CH)

( * ) Notice: Subject to any disclaimer, the term of this patent is extended or adjusted under 35 U.S.C. 154(b) by 561 days.

(21) Appl. No.: 16/328,344

(22) PCT Filed: Aug. 31, 2016

(86) PCT No.: PCT/CH2016/000113
§ 371 (c)(1),
(2) Date: Feb. 26, 2019

(87) PCT Pub. No.: WO2018/039807
PCT Pub. Date: Mar. 8, 2018

(65) Prior Publication Data
US 2021/0291195 A1 Sep. 23, 2021

(51) Int. Cl.
*B02C 19/18* (2006.01)
*H02J 7/00* (2006.01)

(52) U.S. Cl.
CPC ........ *B02C 19/18* (2013.01); *B02C 2019/183* (2013.01)

(58) Field of Classification Search
CPC ..... B02C 19/18; B02C 2019/183; H01B 3/22; H01F 27/321
See application file for complete search history.

(56) References Cited

U.S. PATENT DOCUMENTS 3,234,429 A * 2/1966 Schrom .................. B21D 26/12 315/111.01
4,082,866 A * 4/1978 Link ........................ H01B 3/22 174/15.1
(Continued)

FOREIGN PATENT DOCUMENTS

GB 1047730 A 11/1966
JP S62502733 A 10/1987
(Continued)

OTHER PUBLICATIONS

English translate (JP2010237291A).*
(Continued)

*Primary Examiner* — Jessica Cahill
*Assistant Examiner* — Mohammed S. Alawadi
(74) *Attorney, Agent, or Firm* — Marshall, Gerstein & Borun LLP

(57) ABSTRACT

The invention relates to a method for operating a high-voltage pulse system (1), preferably a system (1) for the fragmenting and/or weakening of material (2) by means of high-voltage discharges, with an energy store (3) for providing the energy for the high-voltage pulses and a charging device (4) for charging the energy store (3). According to the method, in the intended high-voltage pulse operation, a sequence of high-voltage pulses is generated with the system (1) and thereby the energy store (3) is discharged completely at each high-voltage pulse and is only after the expiry of a charging pause (LP) recharged again for the next high-voltage pulse by means of supplying charging energy with the charging device (4).

By means of the operating method according to the invention, a time window is created between two successive high-voltage pulses each, in which the energy store(s) are substantially completely discharged and no charging-voltage is applied. Thereby it becomes possible to short-circuit (Continued)

or earth the energy store (3), respectively, without a short-circuiting or earthing current flowing thereby.

20 Claims, 2 Drawing Sheets

(56) References Cited

U.S. PATENT DOCUMENTS

| | | | | |
|---|---|---|---|---|
| 4,653,697 | A * | 3/1987 | Codina | B02C 19/18 241/1 |
| 5,758,831 | A * | 6/1998 | Collins | B02C 19/186 241/1 |
| 6,039,274 | A | 3/2000 | Zinoviev et al. | |
| 10,919,045 | B2 * | 2/2021 | Weh | B02C 19/18 |
| 2010/0279904 | A1 * | 11/2010 | Deskin | C10M 159/04 508/465 |

FOREIGN PATENT DOCUMENTS

| | | | | |
|---|---|---|---|---|
| JP | H09173885 | A | | 7/1997 |
| JP | 2006228673 | A | * | 8/2006 |
| JP | 2010237291 | A | * | 10/2010 |
| RU | 37654 | U1 | | 5/2004 |
| SU | 1000104 | A1 | | 2/1983 |

OTHER PUBLICATIONS

English translate (JP2006228673A).*

Written Opinion of International Application No. PCT/CH2016/000113, dated Mar. 13, 2017.

International Search Report for International Application PCT/CH2016/000113, dated Mar. 13, 2017.

Papers accompanying decision to grant in relation to RU Application No. 2019109002, dated Aug. 31, 2016.

Second Office Action for JP patent application No. 2019-531497, dated Apr. 5, 2021.

Office Action for JP patent application No. 2019-531497, dated Aug. 31, 2020.

* cited by examiner

METHOD FOR OPERATING A HIGH-VOLTAGE PULSE SYSTEM

CROSS-REFERENCE TO RELATED APPLICATIONS

This is the United States national phase of International Patent Application No. PCT/CH2016/000113, filed Aug. 31, 2016, the entire contents of which are incorporated herein by reference.

TECHNICAL FIELD

The invention relates to a method for operating a high-voltage pulse system, in particular a high-voltage pulse system for the fragmenting and/or weakening of material by means of high-voltage discharges, a system for carrying out the method as well as a use of the system according to the preambles of the independent patent claims.

STATE OF THE ART

In the case of high-voltage pulse systems, as they are for example used for the electrodynamic fragmenting of material by means of high-voltage discharges, the energy stores, usually capacitors, must be discharged and short-circuited or earthed, respectively, when persons can come close to high-voltage-carrying parts during operation for security reasons. This also applies, in particular, to regular maintenance work on such systems as, e.g., the regular exchange of the working electrodes in electrodynamic fragmentation systems.

The short-circuiting or earthing, respectively, of the energy stores is typically accomplished by means of a short-circuiting or earthing switch, respectively, which at the same time also discharges the energy store. The current is limited by a resistor connected in series with the switch such that the switch is not damaged by the short-term rather high current.

During the approach of the two switch contacts, an arc is inevitably formed. The strength and duration of the arc is dependent on the voltage in the energy store. For reasons of insulation, the energy stores are immersed in oil. If the short-circuiting or earthing switch, respectively, is also placed in the oil, arcs are generated in the oil. These burn the oil. Over time, the fire products degrade the insulation properties of the oil, which can ultimately lead to a failure of the electrical insulation.

In order to avoid this, the contacts of the short-circuiting or earthing switch, respectively, are usually located in a gas volume, which in turn is placed in oil. However, this concept can only be used up to a voltage level of approximately 50 kV, because above this voltage the size of the switch as well as of the resistor connected in series increases disproportionately, which not only results in high costs and the necessity of a very large quantity of insulating oil, but also makes certain system geometries preferred for this voltage range practically impossible.

DISCLOSURE OF THE INVENTION

It is therefore the objective to provide a technical solution which does not show the aforementioned disadvantages of the prior art or at least helps to partially avoid these.

This objective is achieved by the method and the system according to the independent patent claims.

According to these, a first aspect of the invention relates to a method for operating a high-voltage pulse system, preferably for fragmenting and/or weakening of material by means of high-voltage discharges. This system comprises one or more energy stores for providing the energy for the high-voltage pulses as well as one or more charging devices for the charging of the energy store(s).

In the intended high-voltage pulse operation, a sequence of high-voltage pulses is generated with the system. Thereby, the energy store(s) is or are substantially discharged completely at each high-voltage pulse, and is or are recharged again only after the expiry of a charging pause by means of supplying of charging energy with the charging device(s) for the next high-voltage pulse.

By means of the operating method according to the invention, a time window is generated in each case between two successive high-voltage pulses, in which the energy store(s) are substantially discharged completely and no charging-voltage is applied.

Thereby it becomes possible, as it is foreseen according to a preferred embodiment of the method, to short-circuit or earth the energy store(s), respectively, in such a voltage-free time window (charging pause) without a short-circuiting or earthing current flowing, in order to switch the system from the intended high-voltage pulse operation into a non-operating state, in which the energy store(s) of the high-voltage pulse system is or are discharged and is or are protected against an unintentional charging by short-circuiting or earthing, respectively.

In this way, the formation of an arc during short-circuiting or earthing, respectively, of the energy store(s) can be completely prevented, which allows the construction of practically wear-free systems in this regard. Correspondingly, as it is foreseen according to a preferred embodiment of the method, it is also possible to dispense with the use of a short-circuiting or earthing resistor during the short-circuiting or earthing, respectively, of the energy store(s).

Furthermore, the operation according to the invention makes it possible to go back to proven and compact system concepts even in voltage-ranges well above 50 kV.

Advantageously, after the short-circuiting or earthing, respectively, of the energy store(s), no more charging energy is supplied to the short-circuited and/or earthed energy store(s) with the charging device(s). This results in the advantage that no short-circuiting or earthing, respectively, of the charging device(s) occurs, with a corresponding load on the charging device(s) and a corresponding energy loss.

The short-circuiting or earthing, respectively, of the energy store(s) is preferably effected by means of short-circuiting or earthing switches. This results in the advantage that it can be automated in a simple manner. For safety reasons, it is further preferred that the short-circuiting or earthing, respectively, takes place by means of at least two short-circuiting or earthing switches per energy store.

If the contacts of the short-circuiting or earthing switch(es) are arranged in oil, which is preferred, advantageously in a common oil-filled container together with the energy store(s), particularly compact systems become possible.

Furthermore, it is preferred that the switching state of the respective short-circuiting or earthing switch is monitored by means of a sensor and/or an optical switching state display. Thereby, the safety can be further improved.

It is also advantageous that the respective short-circuiting or earthing switch is in the closed state, i.e. when it short-circuits or earths the energy store(s), respectively, mechanically secured and/or locked. In this way, an unintentional removal of the short-circuiting or earthing can safely be prevented.

Advantageously, in the method according to the invention, in the intended high-voltage pulse operation, high-voltage pulses are generated with a voltage of more than 50 kV, preferably more than 100 kV, and preferably with a sequence frequency of more than 1 Hz, even more preferably more than 5 Hz.

With such voltages and sequence frequencies, the advantages of the invention become particularly apparent.

A second aspect of the invention relates to a high-voltage pulse system for carrying out the method according to the first aspect of the invention.

This system comprises one or more energy stores for providing the energy for the high-voltage pulses as well as one or more charging devices for the charging of the energy store(s).

Furthermore, the system comprises one or more short-circuiting or earthing switches for securing the energy store(s) by means of short-circuiting or earthing, respectively, against an unintentional charging.

The system also comprises devices for controlling the system with which the system is controllable in such a way that in the intended high-voltage pulse operation it generates a sequence of high-voltage pulses, wherein the energy store(s) is or are substantially completely discharged at each high-voltage pulse and is or are only recharged again after the expiry of a charging pause by supplying charging energy with the charging device(s) for the next high-voltage pulse.

The system according to the invention enables an intended high-voltage pulse operation in which a time window is present in each case between two successive high-voltage pulses, in which the energy store(s) is or are substantially completely discharged and no charging voltage is applied thereto.

Thereby, it becomes possible to short-circuit or earth, respectively, the energy store(s) in such a voltage-free time window (charging pause), and thus to switch the system, without a short-circuit or earthing current flowing thereby, from the intended high-voltage pulse operation into a non-operating state in which the energy store(s) of the high-voltage pulse system is or are discharged and is or are secured against an unintentional charging by means of short-circuiting or earthing, respectively.

For this purpose, in a preferred embodiment of the system, the devices for controlling the system are designed in such a way that, upon a stop command, the system is switchable, by means of closing the short-circuiting or earthing switch(es) in a charging pause following the stop command, into a non-operating state in which the energy store(s) of the high-voltage pulse system is or are discharged and short-circuited or earthed, respectively, and is or are thereby secured against an unintentional charging.

Correspondingly, the formation of an arc in the case of a short-circuiting or earthing, respectively, of the energy store(s) can be completely prevented, with the advantages already mentioned with regard to the first aspect of the invention.

With an advantage, the devices for controlling the system are thereby designed in such a way that, after the short-circuiting or earthing, respectively, of the energy store(s), no more charging energy is supplied to the short-circuited or earthed energy store(s), respectively, with the charging device(s). Thereby, the advantage results that no short-circuiting or earthing, respectively, of the charging device(s) occurs, with a corresponding load of the charging device(s) and a corresponding energy loss.

For safety reasons, it is further preferred for the system to comprise at least two short-circuiting or earthing switches, respectively, per energy store for short-circuiting or earthing of the energy store(s), respectively.

It is also preferred that the contacts of the short-circuiting or earthing switch(es), respectively, are arranged in oil, preferably in a common oil-filled container together with the energy store(s). In this way, particularly compact systems become possible.

Furthermore, it is preferred that the devices for controlling the system comprise a sensor for monitoring the switching state of the short-circuiting or earthing switch and/or that an optical switching state display is present for the visual monitoring of the switching state of the short-circuiting or earthing switch. As a result, the safety of the system can be further improved.

Furthermore, it is an advantage if the system comprises devices with which the respective short-circuiting or earthing switch in the closed state, i.e. when it short-circuits or earths the energy store(s), respectively, can be mechanically secured and/or locked. In this way, an unintentional removal of the short-circuiting or earthing can be reliably prevented.

It is also preferred if the short-circuiting or earthing switch(es) of the system is or are closed in the non-actuated or actuation-energy-free state, respectively. Thereby, the safety of the system can be further improved because the energy store(s) of the system are automatically short-circuited or earthed, respectively, in the event of a failure of the actuating energy for the short-circuiting or earthing switches (for example, electrical current or compressed air).

The high-voltage pulse system according to the invention is advantageously designed such that high-voltage pulses can be generated with it in the intended high-voltage pulse operation with a voltage of more than 50 kV, preferably of more than 100 kV, and preferably with a sequence frequency of more than 1 Hz, even more preferably more than 5 Hz.

In such systems, the advantages of the invention are particularly apparent.

BRIEF DESCRIPTION OF THE DRAWINGS

Further embodiments, advantages and applications of the invention result from the dependent claims and from the now following description with reference to the figures. Thereby show:

MODES FOR CARRYING OUT THE INVENTION

Figure 1:
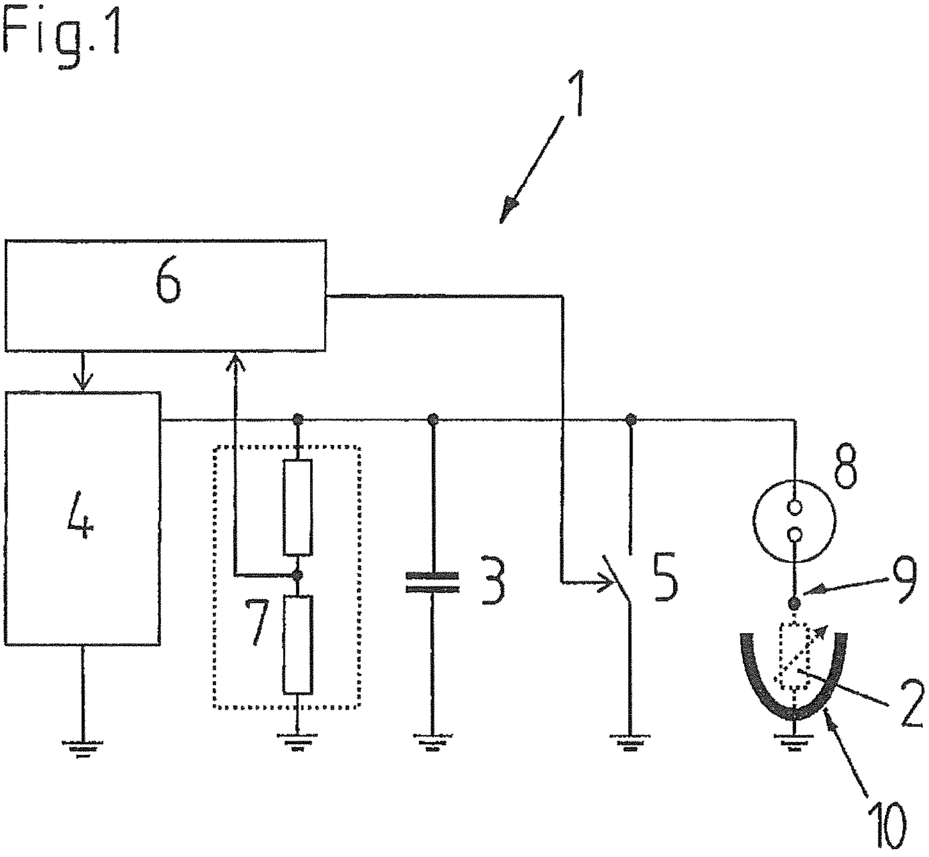
FIG. 1 the circuit diagram of a first high-voltage pulse system for the fragmenting of material by means of high-voltage pulses according to the invention.

FIG. 1 shows the system diagram of a high-voltage pulse system 1 according to the invention for the electrodynamic fragmenting of rock material 2 by means of high-voltage discharges.

The system 1 comprises an energy store in the form of a capacitor 3 for providing the energy for the high-voltage pulses as well as a charging device 4 for charging the capacitor 3, an output switch in the form of a spark gap 8, as well as a high-voltage electrode 9 which faces with a distance and in a process container filled with a processing liquid (water) a counter-electrode 10 which is formed by the bottom of the process container and earthed. Between the high-voltage electrode 9 and the counter-electrode 10, the to-be-fragmented material 2 is arranged, immersed in the processing liquid, in such a way that in the intended high-voltage pulse operation of the system, the high-voltage discharges (high-voltage pulses as claimed) generated between the two electrodes 9, 10 take place through the material 2, which is shown as a variable load resistor.

Furthermore, the system 1 comprises a system controller 6 with a voltage measuring device 7, and an earthing switch 5 for the capacitor 3.

In the intended fragmenting operation (high-voltage pulse operation as claimed), the system 1 generates a sequence of high-voltage discharges between the electrodes 9, 10 through the material 2. Thereby, the capacitor 3 is completely discharged at each high-voltage discharge.

Figure 2:
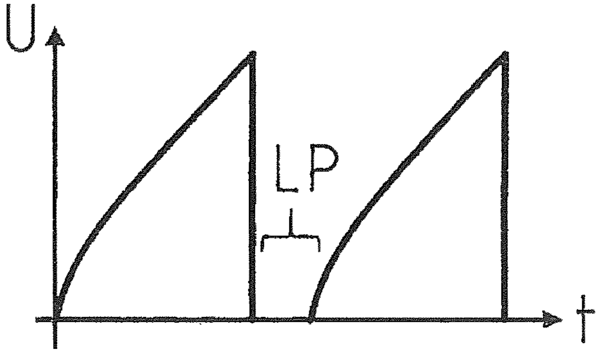
FIG. 2 the voltage course of the energy store of the system of FIG. 1 in the intended high-voltage pulse operation.

The course of the voltage U of the capacitor 3 over the time tin the intended fragmenting operation is shown in FIG. 2, namely over two charging cycles. Thereby, the voltage U at the time of the beginning of the discharge is approximately 100 kV, and each charging cycle including the associated charging pause LP takes about 300 ms.

The system controller 6 detects with its voltage measuring device 7 the breakdown of the voltage U of the capacitor 3 at the respective high-voltage discharge and controls the charging device 4 in such a way that a charging pause (LP) follows the respective discharge, in which the charging device 4 does not provide any charging energy. Only after the expiry of the charging pause LP the capacitor 3 is recharged again by the charging device 4 such that it can provide the energy for the next high-voltage discharge.

If the system 1 is to be switched from the intended fragmenting operation into a non-operating state in which the capacitor 3 is discharged and is protected against an unintentional charging by short-circuiting or earthing, respectively, the system controller 6 closes upon a stop command in a charging pause LP following the stop command the earthing switch 5 and controls the charging device 4 in such a way that, after earthing of the energy store 3, it no longer provides charging energy for the energy store 3.

Figure 3:
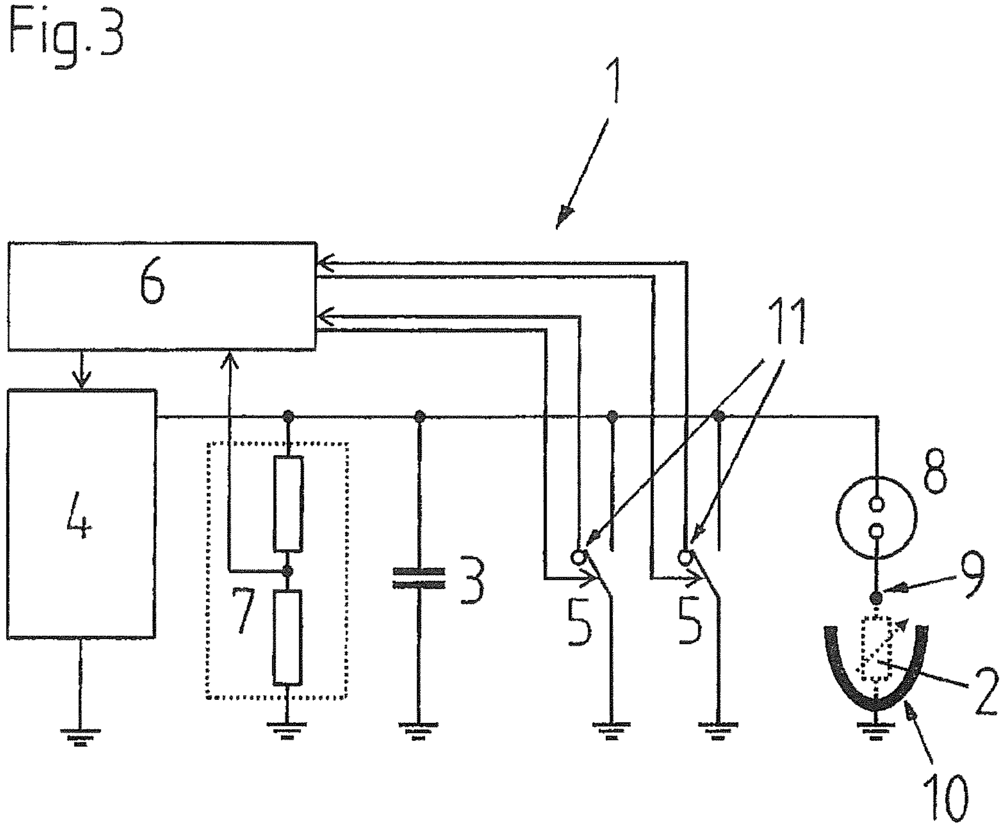
FIG. 3 the circuit diagram of a second high-voltage pulse system for the fragmenting of material by means of high-voltage pulses according to the invention.

FIG. 3 shows the circuit diagram of a second high-voltage pulse system according to the invention for the fragmenting of material by means of high-voltage pulses, which differs from the system shown in FIG. 1 merely in that it comprises two earthing switches 5 for the capacitor 3 and that the switching state of each earthing switch 5 is monitored by the system controller 6 by means of a sensor 11.

While there are described preferred embodiments of the invention in the present application, it is to be clearly pointed out that the invention is not limited thereto and can also be carried out in another manner within the scope of the following claims.

The invention claimed is:

1. Method for operating a high-voltage pulse system for fragmenting and/or weakening of material by means of high-voltage discharges, the system comprising an energy store for providing the energy for the high-voltage pulses and a charging device for charging the energy store, the method comprising:

generating a sequence of high-voltage pulses in a high-voltage pulse operation, completely discharging the energy store while generating each high-voltage pulse, recharging the energy store for a next high-voltage pulse only after the expiry of a first charging pause (LP), whereby recharging comprises supplying charging energy to the energy store with the charging device, and switching the system from the high-voltage pulse operation into a non-operating state, in which the energy store of the high voltage pulse system is discharged and protected against an unintentional charging, wherein switching comprises short-circuiting and/or earthing the energy store during a second charging pause (LP), wherein short-circuiting and/or earthing of the energy store comprises switching one or more short-circuiting or earthing switches to a closed state, wherein contacts of the one or more short-circuiting or earthing switches are arranged in oil, wherein the contacts of the one or more short-circuiting or earthing switches are arranged in a common oil-filled container together with the energy store.

2. Method according to claim 1 wherein no more charging energy is supplied with the charging device to the short-circuited and/or earthed energy store after the short-circuiting and/or earthing of the energy store.

3. Method according to claim 1 further comprising monitoring the switching of the one or more short-circuiting or earthing switches with one or more sensors.

4. Method according to claim 1 further comprising monitoring the switching of the one or more short-circuiting or earthing switches with an optical switching state display.

5. Method according to claim 1 further comprising mechanically securing and/or locking the one or more short-circuiting or earthing switches in the closed state.

6. Method according to claim 1 wherein the high-voltage pulses are generated with a voltage of more than 50 kV, or a voltage of more than 100 kV.

7. Method according to claim 1 wherein the high-voltage pulses are generated with a sequence frequency of more than 1 Hz or a sequence frequency of more than 5 Hz.

8. Method according to claim 1 wherein short-circuiting and/or earthing of the energy store takes place without the use of a short-circuiting or earthing resistor.

9. Method according to claim 1 wherein switching one or more short-circuiting and/or earthing switches comprises switching at least two short-circuiting and/or earthing switches.

10. High-voltage pulse system for fragmenting and/or weakening of material by means of high-voltage discharges, the system comprising:

a) an energy store for providing energy for high-voltage pulses, b) a charging device for charging the energy store, c) one or more short-circuiting and/or earthing switches for securing the energy store against an unintentional charging, and d) devices for controlling the system, wherein the system is controllable by the devices for:

generating a sequence of high-voltage pulses with the energy store during a high-voltage pulse operation, completely discharging the energy store while generating each high-voltage pulse, recharging the energy store for a next high-voltage pulse only after the expiry of a first charging pause (LP), whereby recharging comprises supplying charging energy to the energy store with a charging device, and switching the system from the high-voltage pulse operation into a non-operating state, in which the energy store of the high voltage pulse system is discharged and protected against an unintentional charging, wherein switching comprises short-circuiting and/or earthing the energy store during a second charging pause (LP), wherein contacts of the short-circuiting and/or earthing switches are arranged in oil, wherein the contacts of the short-circuiting or earthing switches are arranged in a common oil-filled container together with the energy store.

11. System according to claim 10 wherein the devices for controlling the system are configured to receive a stop command and switch the one or more short-circuiting and/or earthing switches to the closed state during the second charging pause (LP), thereby switching the system into the non-operating state.

12. System according to claim 11 wherein the devices for controlling the system are configured to allow no more charging energy to be supplied to the energy store with the charging device after switching the one or more short-circuiting and/or earthing switches to the closed state.

13. System according to claim 10 wherein the system comprises at least two short-circuiting and/or earthing switches.

14. System according to claim 10 wherein the system comprises one or more sensors for monitoring a switching state of the one or more short-circuiting and/or earthing switches.

15. System according to claim 10 wherein the system comprises an optical switching state display for the visual monitoring of a switching state of the one or more short-circuiting and/or earthing switches.

16. System according to claim 10 wherein the system comprises devices for mechanically securing and/or locking the one or more short-circuiting and/or earthing switches in the closed state.

17. System according to claim 10 wherein the one or more short-circuiting and/or earthing switches is or are closed in a non-actuated or actuation-energy-free state.

18. System according to claim 10 wherein the high-voltage pulses have a voltage of more than 50 Kv or more than 100 kV.

19. System according to claim 10 wherein the high-voltage pulses have a sequence frequency of more than 1 Hz or of more than 5 Hz.

20. Use of the high-voltage pulse system according to claim 10 for the fragmenting of particularly electrically poorly conducting material or material composites of concrete, rock, ore rock, or slag by means of high-voltage pulses generated by the system.

* * * * *